Patented Nov. 8, 1949

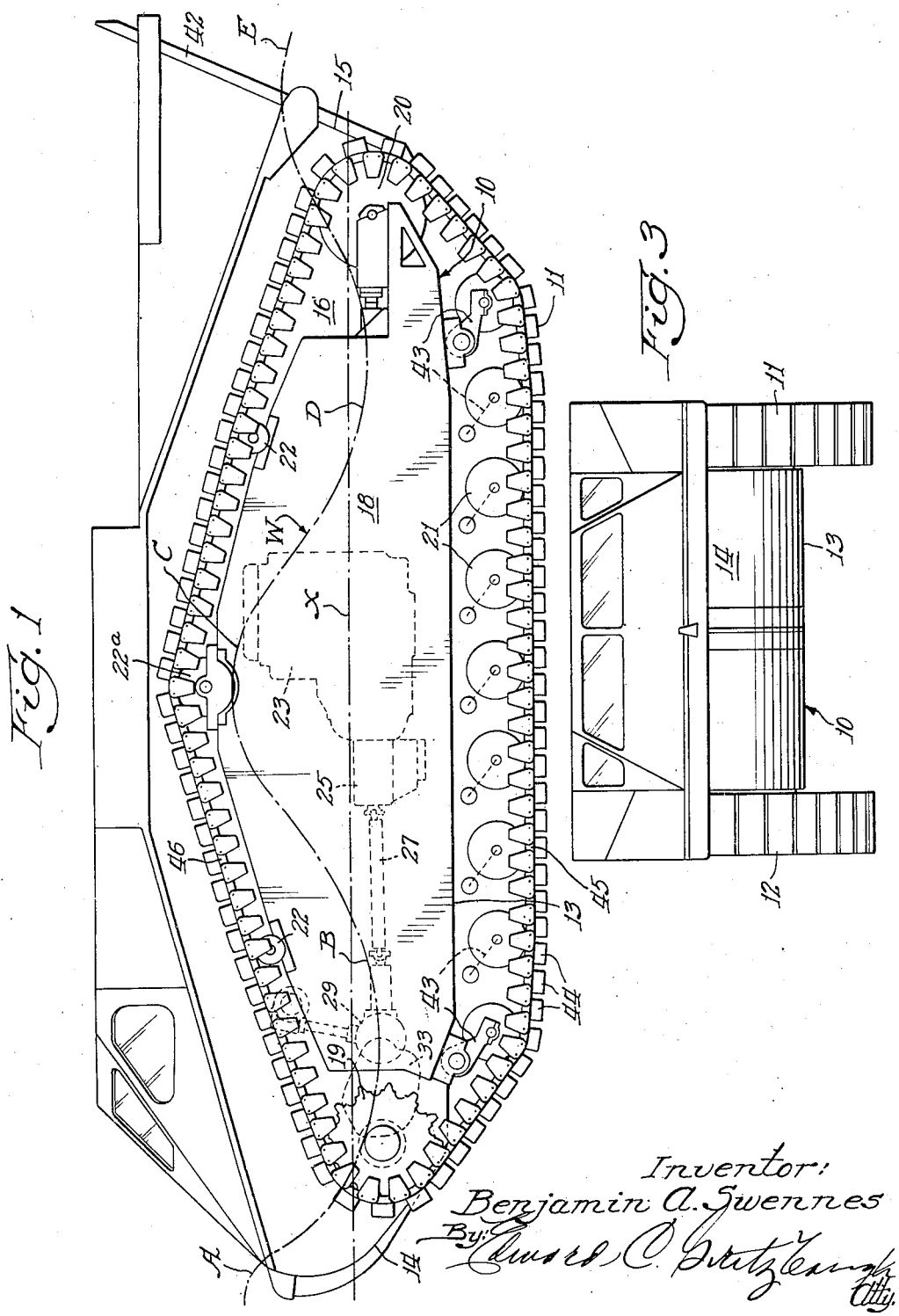

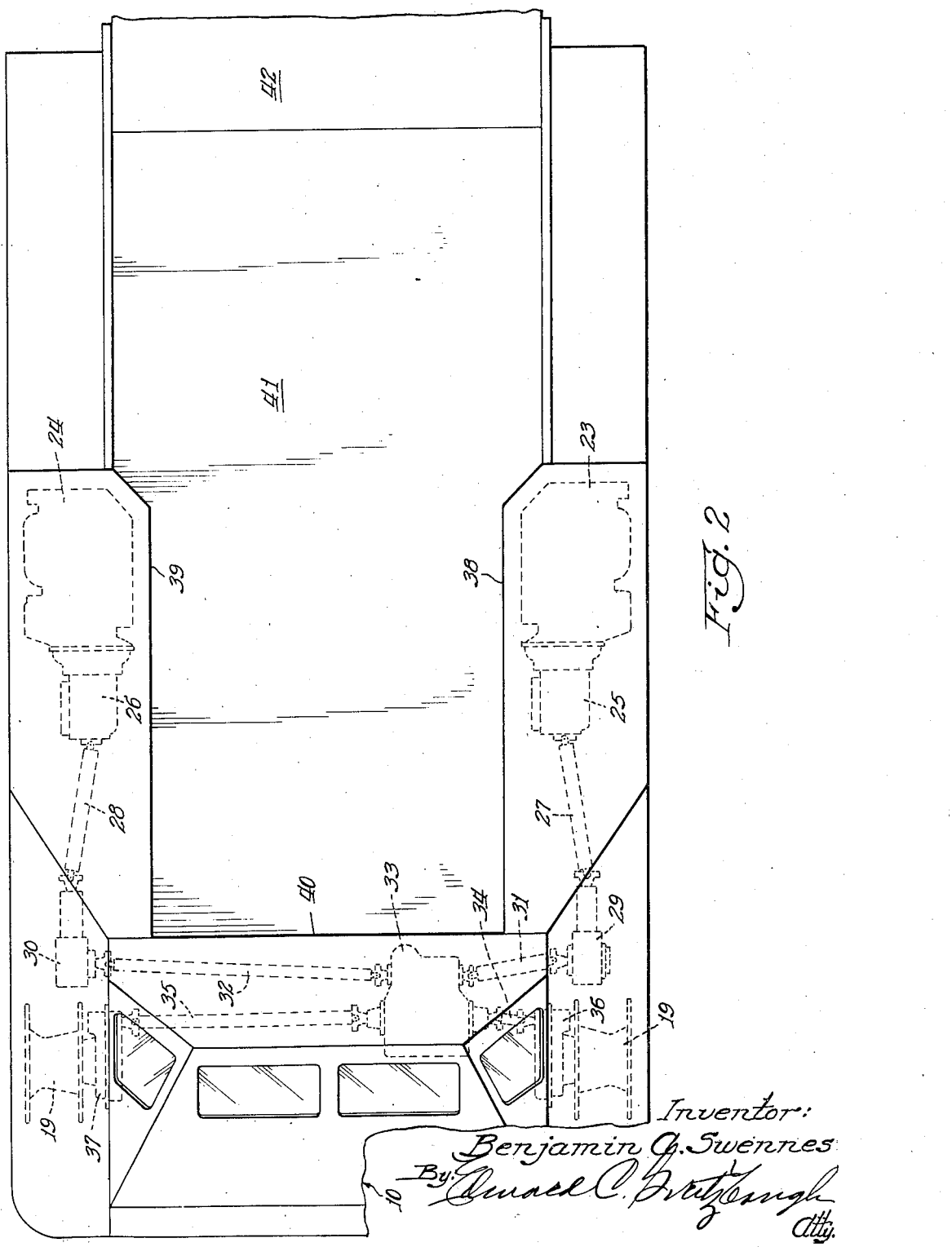

2,487,397

UNITED STATES PATENT OFFICE 2,487,397

AMPHIBIAN TANK

Benjamin A. Swennes, Rockford, Ill., assignor, by mesne assignments, to the United States of America as represented by the Secretary of the Navy Application August 30, 1946, Serial No. 693,862

7 Claims. (Cl. 115—1)

My invention relates to vehicles and more particularly to motor driven vehicles of the type propelled over land or through the water by movable belts or tracks disposed on the exterior of the vehicle.

Vehicles of the type described have tracks disposed on opposite sides thereof with each track being held in looped configuration by driving and guiding wheels which provide an upper non-propelling stretch of track above the water and a lower propelling stretch of track in the water, the stretches of track moving in opposite directions lengthwise of the vehicle. To secure maximum efficiency in the propulsion of the vehicle through the water, it is essential, due to these movements of the lower and upper stretches of the tracks, that the upper stretches of the tracks be positioned out of contact with the water otherwise these stretches of tracks retard the propulsion efforts of the propelling stretches of track and thereby the motion of the vehicle in the desired direction. In explanation, the vehicle is propelled through the water by the lower propelling stretches of track moving in a direction opposite to movement of the vehicle while the upper non-propelling stretches of track move in the same direction as the vehicle. During passage of the vehicle through the water, waves are produced on the sides of the vehicle having their crests between the ends of the vehicle. As the wave crests move in a direction opposite to the movement of the upper stretches of the tracks, contact of the wave crests with these stretches of the tracks will impede and retard their movement with consequent decrease in the motion of the propelling lower stretches of track and a reduction in the speed of movement of the vehicle in the desired direction.

To solve this problem, various methods have been devised to insure the upper propelling stretches of track being disposed above the waves produced by the passage of the vehicle through the water. For example, the tracks have been positioned on opposite sides of the vehicle with their lower propelling stretches in the water and their upper non-propelling stretches a substantial distance above the water, these stretches of track being joined at their ends by substantially parallel vertical stretches of the remainder of the track. While tracks disposed in this manner satisfactorily maintain the upper stretches of the tracks above the waves, the length of heavy track required and the disposition of the greater portion thereof above the water adds a substantial amount of weight to the vehicle retarding the speed of the vehicle through the water and rendering steering of the vehicle difficult, as well as providing increased opportunity for mechanical failure occurring in the tracks. These disadvantages have been recognized in the art and it has been proposed that a shorter length of track be used having the upper non-propelling stretches of tracks disposed within tunnels in the sides of the vehicle body to prevent contact of the waves with said stretches. While this arrangement has proven satisfactory for the purpose described, it is impracticable as it frequently occurs that debris, trees and so forth, are picked up by the tracks during passage of the vehicle through the water and over land and carried by the tracks into the tunnels with considerable force, thereby jamming the tracks with consequent failure of movement of the tracks or breakage of the tracks.

My invention is directed to a novel arrangement for advantageously positioning the tracks in a looped configuration by the driving and guiding wheels on each side of a vehicle of the type described in such manner that the length of track is substantially reduced and the upper non-propelling stretch of track is disposed exteriorly of the vehicle and above the water and beyond the reach of wave crests produced by the passage of the vehicle through the water.

My novel track arrangement has been designed as a result of observation of the wave motion produced by passage of the vehicle through the water. When a water vehicle moves through the water, a wave train is produced, starting with a large bow wave, the second wave of the train having its crest substantially at the center of the vehicle with the wave hollow between these two wave crests dipping beneath the normal water level. At the same time, the stern of the vehicle initiates its own wave train starting with a hollow near the stern which hollow coincides quite closely with the second bow wave hollow making the hollow deeper than it would be from either initiating cause alone. The waves thus described have crests at the bow and stern of the vehicle and substantially centrally of the vehicle, a wave hollow being had between the bow and the center line of the vehicle, and another wave hollow between the center line of the vehicle and stern of the vehicle. The aforesaid wave motion is the same for substantially all water vehicles having parallel sides, irrespective of the propelling means utilized.

With these observations in mind, my invention contemplates mounting the tracks on the guiding and driving wheels at opposite sides of the vehicle, with each track being held in looped configuration by two of the wheels at opposite ends of the vehicle to provide a substantially horizontal portion thereof in the water for propulsion purposes, and an upper stretch of track positioned by another wheel to dispose this stretch at a higher level than the two aforesaid wheels and above the wave crest produced substantially at the center line of the vehicle, the upper stretch of track sloping downwardly at opposite sides of said center line into the wave hollows between the aforesaid wave crest and the bow and stern wave crests toward the two driving and guiding members at opposite ends of the vehicle. Thus, the upper propelling stretch of track follows the wave profile in general as it is low at each of the low wheels at opposite ends of the vehicle and high at the center line of the vehicle and thereby will be maintained above the wave crest and water surface with consequent minimum engagement with the water and retardant effect on the propulsion of the vehicle by the lower submerged propelling stretch of track. Other advantages accruing from my novel arrangement of track as described and for the purpose described are a reduction of the track length without reducing the propelling portion of the track, the resultant relatively shorter length of track making the vehicle lighter and therefore easier to control and also reducing mechanical difficulties.

Accordingly, it is an object of my invention to provide a water vehicle having tracks disposed on opposite sides thereof, adapted to propel the vehicle through the water with maximum efficiency.

Another object of my invention is the provision of a track-propelled water vehicle having the tracks disposed in such manner as to afford a maximum stretch of propelling track and an upper non-propelling stretch of track disposed above the water surface and out of reach of waves produced by passage of the vehicle through the water.

A further object of my invention is to provide a novel track propulsion arrangement of the type described for an amphibian vehicle.

Further objects and advantages will more definitely appear from the following detailed description of a certain preferred embodiment illustrated in the accompanying drawing:

Fig. 1 is a side view of an amphibian vehicle embodying the invention;

Fig. 2 is a top plan view of the vehicle; and

Fig. 3 is a front view thereof.

In the drawing, similar numerals of reference refer to similar parts throughout the several views.

Referring to the drawing, my invention is shown as embodying, for illustrative purposes, an amphibian cargo carrier comprising a box-shaped hull generally designated 10 on opposite sides of which are disposed movable tracks 11 and 12. The hull 10 is water-tight and is capable of floating, thereby functioning as a boat, and, furthermore, the hull is rigidly constructed so that the vehicle may function similarly to a military tank to run over uneven terrain without being permanently distorted out of shape. More specifically, the hull 10 is formed with a substantially flat bottom wall 13 and at each end thereof with flat front and rear walls 14 and 15 upwardly diverging and respectively forming the bow and stern of the vehicle. Each of the parallel side walls 16 of the vehicle is provided with an outwardly extending sponson 18 around which one of the tracks 11 or 12 is held in looped configuration by a driving sprocket 19, an idler 20, bogey wheels 21, and rollers 22 and 22a. The driving sprockets 19 are mounted in the side walls 16 of the vehicle adjacent the bow thereof and are each driven by a pair of motors 23 and 24 disposed in the sponsons 18. The motors 23 and 24 have mounted thereon transmissions 25 and 26, respectively, and the transmissions are connected with driven shafts 27 and 28, respectively. The shafts 27 and 28 are rotatably mounted in bearings (not shown) fixed with respect to the hull 10 and the shafts are connected with right angle drive units 29 and 30, respectively. The right angle drive units 29 and 30 are connected by means of shafts 31 and 32, respectively, with a combined two-speed transfer unit and controlled differential transmission 33. The transmission 33 is connected by means of shafts 34 and 35 with final gear drive units 36 and 37, respectively, which function to drive the sprocket wheels 19 on opposite sides of the vehicle. The prime mover means 25 and 26 and the driving arrangement between the same and each of the sprocket wheels is more particularly described in my copending application, Serial No. 508,304, filed October 30, 1943, now matured into Patent No. 2,456,542 of December 14, 1948, and forms no part of the present invention. It will be apparent that the motors, transmissions and their driving connections to each other and to the sprockets are such that the bow and stern of the vehicle, as well as the sides thereof, will be substantially balanced whereby the center of gravity of the vehicle is substantially at the center of the vehicle.

It will be apparent from an inspection of the drawings and particularly Fig. 2 thereof, that due to the disposition of the motors 23 and 24 and the driven shafts 27 and 28 in the side sponsons of the vehicle there is provided an unobstructed space in the center of the vehicle. This space extends between the sheet metal protective coverings 38 and 39 for the motors and the driven shafts, and it extends longitudinally of the vehicle from the protective sheet metal covering 40 for the transmission 33 and the shafts 31, 32, 34 and 35 adjacent the bow of the vehicle to the stern of the vehicle. This vehicle is provided with a substantially flat floor or surface 41 extending between the sheet metal coverings 38 and 39 and between the sheet metal covering 40 and the stern of the vehicle, and cargo may be placed on this surface in the space defined by these sheet metal coverings to be transported in the vehicle.

A gate 42 is hingedly mounted on the stern of the vehicle by means of a horizontally extending hinge and the gate is adapted to pivotally move downwardly. When the gate is in such a lowered position, it provides access at the stern of the vehicle into the cargo space between the motors 23 and 24 and the driven shafts 27 and 28 and the gate 42, when in such position, is also adapted to function as a ramp on which cargo may be moved into cargo space in the vehicle. The gate 42 may be raised or lowered by any suitable means.

Referring to Fig. 1, it may be noted as previously stated, that the sprockets 19 are rotatably mounted for driving by the driving units 35 and 36, respectively, and positioned adjacent the bow of the vehicle. The idlers 20 are on the stern of the vehicle and they are preferably adjustable by any suitable means (not shown) to take up any slack in the tracks 11 and 12 as may be desired. The rollers 21 are on fixed axes with respect to the vehicle and the bogey wheels 21 on the bottom of the vehicle are yieldably fixed with respect to the vehicle by suitable spring mountings 43 which permit the wheels 21 to move toward or away from the hull 10 when the vehicle is driven over rough ground. The spring mountings for the bogey wheels 21 may be of the construction shown in a copending application of C. E. Swenson, Serial No. 513,480, filed December 8, 1943, and now abandoned. The tracks 11 and 12 are of the articulated type and have lugs 44 fixed thereon. The lugs 44 function when the vehicle is in the water and the tracks are driven by the sprockets 19 to propel the vehicle through the water, and the lugs 44 function, when the vehicle is on land, to provide a firm grip with the ground for propelling the vehicle over land.

The illustrated vehicle is so constructed that when it is in the water, the vehicle will float with the lower portion thereof submerged below the water level indicated by the horizontal line X in Fig. 1. As a consequence, each track will have its lower portion or stretch 45 between the sprocket 19 and idler 20 disposed within the water and its upper portion or stretch 46 between the sprocket 19 and idler 20 disposed above the water. When the vehicle moves in a forward direction or toward the left as viewed in Fig. 1, the lower stretches 45 of the tracks will move rearwardly of the vehicle and by reason of the water constituting a reaction medium against which the lugs 44 act, the lugs will propel the vehicle through the water. During this propulsion of the vehicle by the lower propelling stretches 45 of the tracks, the upper non-propelling portions or stretches 46 of the tracks will move toward the bow of the vehicle or in the direction of movement of the vehicle and it will be apparent that it is desirable to hold and maintain these upper stretches of the tracks above the water and any wave crests produced by the passage of the vehicle through the water inasmuch as the wave crests moving counter to the direction of the upper stretches and impinging thereon will act as a brake and retard the movement of the tracks with consequent decrease in the speed of movement of the vehicle through the water in the desired forward direction.

Referring now more particularly to Fig. 1, I have illustrated the wave motion at each side of the vehicle and produced by the passage of the vehicle through the water by the wave-like line W. When the vehicle moves through the water, a wave train is produced at each side of the vehicle which starts with a large bow wave, indicated by A which designates its crest and an ensuing hollow B. The second wave of the train, having its crest designated at C, is substantially at the center line of the vehicle, and the ensuing wave hollow D dips beneath the normal water level. At the same time, the stern of the vehicle initiates its own wave train starting with a wave having its crest at E at the stern and a hollow along the side of the boat and near the stern. While I have designated the second wave hollow as D, D also represents the hollow formed by the stern wave inasmuch as these two hollows coincide quite closely and can therefore be represented as one hollow. This merging of the hollows of the waves C and E makes the hollow D deeper than it would be from either initiating cause alone. Thus, it will be apparent that the wave motion provides a wave crest at A at the bow of the vehicle, a hollow B intermediate the bow of the vehicle and the center line of the vehicle, a wave crest at C at the center line of the vehicle, a wave hollow at D between the center line and the stern of the vehicle, and a wave crest at E at the stern of the vehicle. The wave motion along the sides of the vehicle produced by the passage of the vehicle through the water may be advantageously utilized by disposing the track on each side of the vehicle in a looped configuration by its associated sprockets, idler, bogey wheels, and rollers to position the lower propelling stretch 45 of each track in the water and to dispose the upper non-propelling stretch 46 of the track by means of the rollers 22 at a higher level than the sprocket wheel 19 and idler 20, so that this latter stretch of track will be at all times above the water as well as the crest C of the wave formed at the center line of the vehicle and produced by the passage of the vehicle through the water. It will be noted that each track is positioned by its sprocket 19, idler 20, bogey wheels 21 and rollers 22 and 22a in the form of a pentagon with the upper stretch of track maintained by means of the rollers 22a at the top and center line of the boat above the wave crest C and the rollers 22 at a lower level intermediate the top and bottom of the vehicle and between the wave crests A and C, and C and E, respectively, so that the upper stretch 46 of track will be supported and passed over the wave crest C and the surface of the water without at any time coming in contact with the water or the wave crest. In this manner, the lower propelling stretches 45 of the tracks will operate with maximum efficiency inasmuch as the upper stretches 46 of the tracks will not encounter the wave crests or water with a consequent retardant effect on the driving force of the tracks and the speed of movement of the vehicle through the water.

While I have described the invention with reference to an amphibian vehicle, it is believed to be equally applicable to any type or shape of motor-driven water vehicle utilizing tracks for propelling the vehicle through the water.

I claim:

1. In a motor driven water vehicle, the combination of a water-tight vehicle body, said body when passing through the water producing a wave on each side having a crest between the ends of the body, a pair of endless belts mounted externally of and on opposite sides of said body, driving and guiding wheels holding said belts in looped configurations thereby providing an upper stretch of belt and a lower stretch of belt, said wheels including end wheels adjacent the ends of said body and positioned below the wave crests whereby said lower stretches of belts are below the water line of said body propelling elements on said belts whereby the lower stretches of the belts propel the vehicle through the water, a motor in said body for driving said driving wheels and thereby said belts, and a wheel external of and mounted on each side of the body disposed substantially over the wave crest at a higher level than said end wheels for supporting the upper stretch of belt whereby the upper stretches of said belts move above and out of contact with the wave crests and over the surface of the water.

2. In an amphibian vehicle, the combination of a water-tight vehicle body, a pair of tracks external of and on opposite sides of said body, driving and guiding wheels holding each of said tracks in a looped configuration, said wheels for each of said tracks including wheels adjacent the ends of the body thereby providing an upper non-propelling stretch of track and a lower stretch of track, propelling elements on each of said tracks whereby the same are adapted to propel said body through water and over land, said body when passing through water producing a water wave on each side of the body having a crest between the ends of the body, said end wheels being positioned in a plane substantially below said wave crests whereby said lower propelling stretch of each track is positioned below the water line of said body for propelling said body, a motor in said body for driving said driving wheels and thereby said tracks, a wheel external of and on each side of said body disposed substantially over and substantially above the wave crest and at a higher level than said end wheels for supporting the upper stretch of track for movement above and substantially out of contact with the wave crests, and wheels in engagement with the lower stretches of said tracks and yieldingly connected to and supporting said body during passage of said vehicle over land.

3. In a motor driven water vehicle, the combination of a water-tight vehicle body comprising a flat bottom wall and front and rear walls diverging upwardly at opposite ends thereof and having side walls merging with said walls and comprising a pair of sponsons, said body when passing through the water producing a wave on each side having a crest between the ends of the body, a pair of endless belts movably disposed about said sponsons, driving and guiding wheels including wheels at opposite ends of said sponsons holding each of said belts in a loop configuration thereby providing an upper stretch of belt above each sponson and a lower stretch of belt beneath each sponson, said last-mentioned wheels being below the wave crests and said lower stretches of belts being below the water surface, propelling elements on said belts whereby the lower stretches of the belts propel the vehicle through the water, a motor in said body for driving said driving wheels and thereby said belts, and a wheel on each side wall disposed above its sponson and at a higher level than said driving and guiding wheels for supporting the associated upper stretch of each belt over and above the wave crests and over the surface of the water.

4. In a motor driven amphibian vehicle, the combination of a vehicle body comprising a flat bottom wall and front and rear walls diverging upwardly at opposite ends thereof and having side walls merging with said walls and comprising a pair of sponsons, said body when passing through the water producing a wave formation on each side of said body having crests and troughs with a crest of the wave occurring substantially at each end of said body and a crest occurring intermediate the ends of said body, a pair of endless tracks movably disposed about said sponson externally of said body, driving and guiding wheels on said body holding each said track in looped configuration for propelling said body over land and through water, said wheels including wheels at opposite ends of said sponsons and located substantially in the locations within which the trough portions of the wave formation occur, a wheel on each side wall disposed above a sponson substantially above and adjacent the location in which the crest portion of the wave formation occurs, said looped configuration providing an upper stretch of track above each sponson and a lower stretch of track beneath each sponson and said bottom wall, said last-mentioned wheels and said lower stretches being disposed below the water surface whereby said lower stretches propel the vehicle through the water, a motor in said body for driving said driving wheels and thereby said tracks, and wheels extending beneath said body and in engagement with the lower stretch of said tracks and yieldingly connected to and supporting said body during passage of said vehicle over land.

5. In a water vehicle, the combination of a water-tight vehicle body, said body when passing through the water producing a wave formation on each side having crests and troughs with a crest occurring substantially at opposite ends of said body and a crest occurring intermediate the said ends of said body, a pair of endless belts mounted externally of and on opposite sides of said body and comprising propelling elements, driving and guiding wheels adjacent opposite ends of the body for supporting each said belt in a looped configuration having an upper stretch of belt and a lower stretch of belt, said wheels being below wave crests whereby said lower stretches of belts are below the water surface for propelling said body through the water, and means for driving said driving wheels and thereby said belts, a guiding wheel disposed in a horizontal plane above the wave crest and the other wheels of the set for supporting the upper stretches of said belts over said wave crests and the surface of the water.

6. In a water vehicle, the combination of a water-tight vehicle body, a pair of endless belts external of and on opposite sides of said body and comprising elements adapted to propel the vehicle through water, driving and guiding wheels holding said belts in looped configuration, the set of wheels for each belt comprising wheels adjacent opposite ends of the body providing an upper stretch of track above the water and a lower stretch of track below the water whereby said lower stretch of each belt propels said body through the water, and means for driving said driving wheels and thereby said belts, said vehicle when moving through the water generating a wave formation having a trough portion occurring at the locations of said wheels adjacent opposite ends of said body and having a crest portion intermediate said opposite ends, each set of wheels including a guide wheel disposed in a horizontal plane above the other wheels of said set and located a predetermined distance above the region in which the wave crest occurs whereby said upper stretch of each said belt diverges downwardly from a point located a predetermined distance above the wave crest toward points within the wave troughs and toward the wheels adjacent opposite ends of the body and is positioned sufficiently above the water surface to prevent engagement with the wave crests produced by passage of the vehicle through the water.

7. In a water vehicle, the combination of a water-tight vehicle body, said body when passing through the water producing a wave formation on each side of said body with the wave formation having trough portions occurring substantially at opposite ends of said body and having a crest portion intermediate the trough portions occurring substantially centrally between the ends of the body, a pair of belts external of and on opposite sides of said body, and a set of driving and guiding members on said body for each said belt, two of the members of each set being disposed adjacent opposite ends of said body and providing an upper and lower stretch of the associated belt, said lower stretch being disposed beneath the water line of said body, a guide member on said body and located in the region thereof substantially adjacent to the occurrence of the wave crest, said guide member supporting said upper stretch of each said belt whereby each said upper stretch of each said belt moves along a path extending from points just above the trough portions to a point just above the crest portion, and means for driving said driving members and thereby said loops.

BENJAMIN A. SWENNES.

REFERENCES CITED

The following references are of record in the file of this patent:

UNITED STATES PATENTS

| Number | Name | Date |
| --- | --- | --- |
| 304,426 | Hart | Sept. 2, 1884 |
| 2,416,128 | Swennes | Feb. 18, 1947 |